US006953316B2

(12) United States Patent
Neufeldt et al.

(10) Patent No.: US 6,953,316 B2
(45) Date of Patent: Oct. 11, 2005

(54) REFUSE/RECYCLABLES MATERIALS COLLECTING APPARATUS

(75) Inventors: Dennis Neufeldt, Coaldale (CA); Simon Hann, Lethbridge (CA)

(73) Assignee: Haul-All Equipment Ltd., Alberta (CA)

( * ) Notice: Subject to any disclaimer, the term of this patent is extended or adjusted under 35 U.S.C. 154(b) by 119 days.

(21) Appl. No.: 10/376,368

(22) Filed: Feb. 28, 2003

(65) Prior Publication Data

US 2004/0170492 A1 Sep. 2, 2004

(51) Int. Cl.7 .................................................. B60P 1/04
(52) U.S. Cl. ................................. 414/525.6; 414/525.2
(58) Field of Search ................................ 414/469, 487, 414/525.51, 525.6, 525.2; 280/80; 292/98, 99

(56) References Cited

U.S. PATENT DOCUMENTS 3,709,388 A * 1/1973 Neufeldt ..................... 414/556
3,750,813 A * 8/1973 Fishburne ................... 414/501
4,103,790 A * 8/1978 Neufeldt ..................... 414/546
4,867,630 A * 9/1989 Johnson et al. ............. 414/409
4,915,570 A * 4/1990 Rath et al. .................. 414/409
5,393,190 A * 2/1995 Vickary ...................... 414/420
6,077,020 A * 6/2000 Neufeldt et al. ............ 414/399

FOREIGN PATENT DOCUMENTS

CA 1012500 * 6/1977 .................. 214/79

* cited by examiner

*Primary Examiner*—Eileen D. Lillis
*Assistant Examiner*—Charles A. Fox
(74) *Attorney, Agent, or Firm*—Dinsmore & Shohl LLP

(57) ABSTRACT

A mechanism for effecting a latching action between a loading bucket and a rock shaft assembly for a self-loading refuse/recyclables handling vehicle. By providing a latch and release mechanism that allows the bucket and rock shaft assembly to engage and disengage over a range rather than one particular point, the various flow characteristics of the different materials can be better accommodated and the collection vehicle can function properly under a wide variety of operating conditions.

2 Claims, 5 Drawing Sheets

BUCKET IN NORMAL POSITION WITH HOOK FULLY LATCHED

BUCKET PARTIALLY ROTATED WITH HOOK IN FINAL LATCHING POSITION

BUCKET RELEASED HOOK DISENGAGED

REFUSE/RECYCLABLES MATERIALS COLLECTING APPARATUS

BACKGROUND OF THE INVENTION

This invention relates to improvements in refuse/recyclables materials collecting apparatus and in particular to an improved mechanism for effecting a locking action between a loading bucket and a rock shaft assembly for a self-loading refuse/recyclables handling vehicle.

Reference may be had to the mechanisms described in U.S. Pat. No. 4,103,790 entitled "Bucket Actuating Linkage" of Neufeldt. This patent describes a self-loading refuse or recycling vehicle including a locking mechanism between the loading bucket and rock shaft assembly. The patent discloses a drive linkage for actuating the shaft which was simpler than mechanisms previously described. This patent also describes a preferred lock and release mechanism. The lock allows the bucket to engage the rock shaft assembly for the loading part of the cycle and to disengage from the rock shaft assembly for the packing part of the cycle. Under ideal conditions this arrangement operates in a satisfactory manner. For some applications and material types, conditions are less than ideal and there are certain instances where the mechanism can fail to function properly. This has become more evident as recycling increases in popularity and collection of segregated material becomes more prevalent. Each segregated material will react differently to compaction when collected independently as compared to a general collection of the total municipal waste stream.

SUMMARY OF THE INVENTION

It is therefore the object of this invention to alleviate the problem noted above and to allow one vehicle to collect municipal solid waste as well as the independent collection of any materials that have been segregated from the waste stream. By providing a latch and release mechanism that allows the bucket and rock shaft assembly to engage and disengage over a range rather than one particular point, the various flow characteristics of the different materials can be better accommodated and the collection vehicle can function properly under a wide variety of operating conditions.

The present invention is directed to an improved latching mechanism between a bucket and a rock shaft assembly which allows the latching mechanism to function properly under less than ideal conditions. These conditions may occur when material is trapped between the bucket and rock shaft assembly as the assembly is retracted out of the body after a packing cycle. Under the prior art arrangements, there was potential for one or more pairs of latching hooks, comprising the lock, to not engage properly, thus allowing the bucket to rotate away from the rock shaft assembly instead of continuing to its lower, loading position.

A refuse/recyclables materials collecting apparatus according to the invention comprises:

a) a collection body for receiving said materials;

b) a loading bucket mounted to said collection body;

c) a rocker assembly rotatably mounted to said collection body and secured to said bucket for rotation of said bucket between a lower loading position and outer and inner raised positions with compaction of materials discharged into said collection body occurring as said bucket moves from said outer to said inner position relative to said collection body;

d) said bucket being pivotally connected to said rocker assembly to allow pivotal motion of said bucket relative to said rocker assembly when compacting of the material takes place between the outer and inner bucket positions;

e) a latching mechanism engaging to prevent the pivotal motion of said bucket relative to said rocker assembly during bucket motion between said lower loading position and the outer one of said bucket positions and disengaging to allow said relative pivotal motion during bucket movement between the outer and inner positions;

f) said latching mechanism being adapted to permit said bucket and rocker assembly to engage and disengage from one another over a selected range of angular positions of said bucket relative to said rocker assembly.

The rocker assembly preferably comprises a rock shaft having a plurality of rocker arms fixed thereto with distal end portions of said arms being connected at respective pivot points to said bucket to allow said relative pivotal motion.

The latching mechanism is preferably adapted to engage said bucket at discrete multiple positions corresponding to multiple angular positions of said bucket with respect to said rocker arms within said selected range.

The latching mechanism typically includes latch hooks fixedly mounted to a latch shaft which in turn is rotatably mounted to said rocker arms, said bucket including connecting lugs fixed thereto for engagement by the respective latch hooks and a mechanism for rotating said latch shaft to bring said latch hooks into engagement with said bucket connecting lugs to prevent said pivotal motion of the bucket relative to said rocker arms as the bucket is moved between said loading position and said outer position. Said mechanism may comprise a cam and a cam follower assembly to effect said rotation of the latch shaft.

The latch hooks are preferably each provided with multiple notches, each being adapted to engage with an associated connecting lug with each notch defining a respective one of said multiple angular positions of said bucket with respect to said rocker arms.

In accordance with a preferred embodiment, there are provided several fixed lugs on the bucket and several rotating latch hooks on the latch shaft assembly. The latch hooks engage and disengage through a cam located on the collection body and the latches have multiple notches to engage the fixed lugs on the bucket.

The rotating portion of the locking mechanism releases the bucket from the rock shaft assembly at the appropriate time during the "IN" cycle and engages to secure the bucket to the rock shaft assembly at the appropriate time during the "OUT" cycle. The multiple location latch hook allows the engagement to occur at multiple degrees of rotation between the bucket and the rock shaft assembly.

BRIEF DESCRIPTION OF THE DRAWINGS

These and other features of the invention will become clear from the description of a preferred embodiment of the invention which follows wherein reference is made to the following drawings.

DETAILED DESCRIPTION OF THE PREFERRED EMBODIMENT

Figure 1:
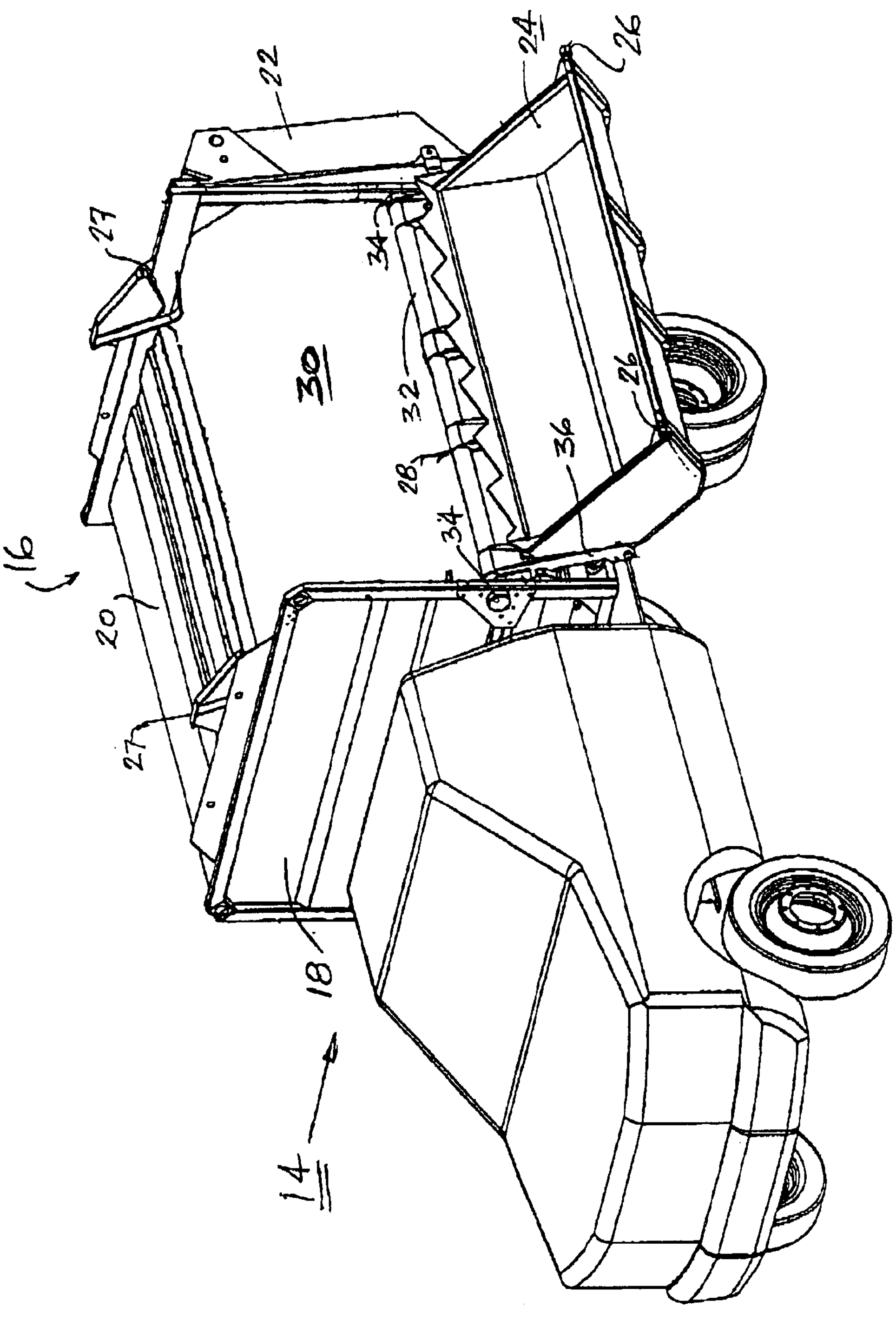
FIG. 1 is a perspective view of a side loading collection body with the rock shaft assembly fully rotated out of the body and the bucket in the loading position.

Referring now to the drawings there is shown a refuse/recyclables materials collecting vehicle 14 including a truck-mounted collection body 16 which may be of a generally conventional design. The collection body 16 includes the usual front body panel 18, top panels 20 and outwardly swingable rear gate 22 mounted by hinges at its upper end and controlled by a hydraulic actuator (not shown) thereby to open the rear gate 22 to allow the compacted materials to be dumped, all in well-known fashion.

FIG. 1 shows the collection body 16 as having a loading bucket 24 mounted thereto with the loading bucket being shown in the lower loading position. The loading bucket is provided with fore and aft bucket rollers 26 which come into engagement with front and rear trackways 27 mounted to the front and rear upper portions of the collection body 16 to guide bucket motion during compaction in a well-known fashion.

Figure 2:
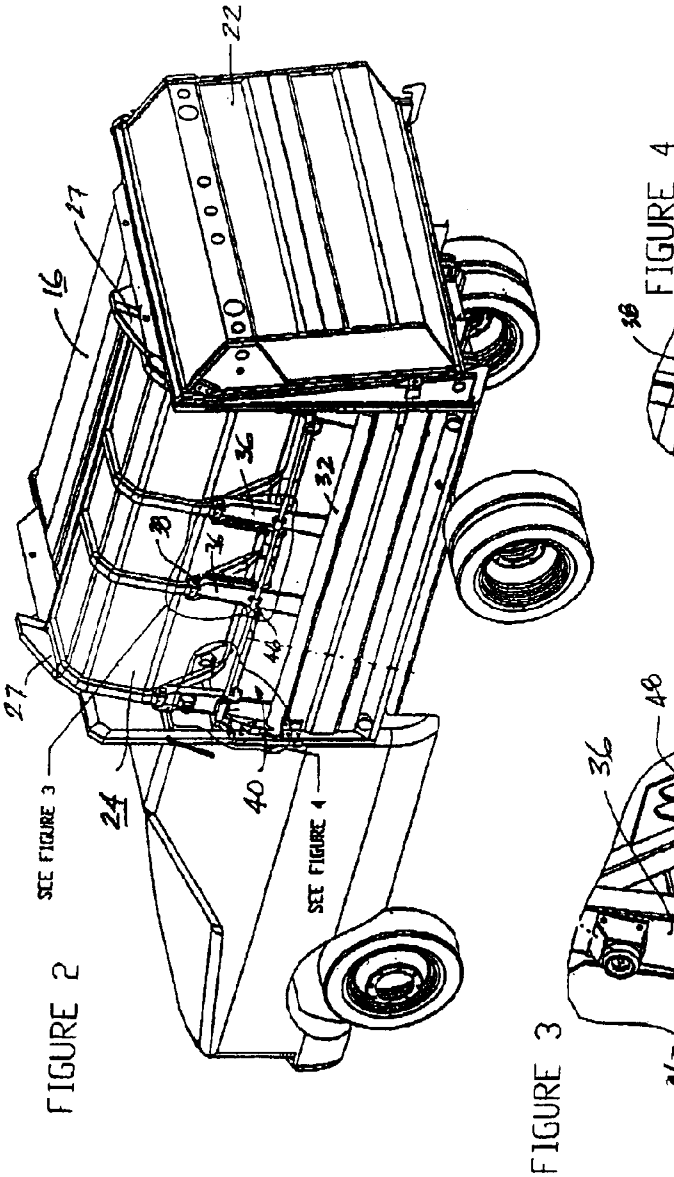
FIG. 2 is a perspective view showing the bucket in the "IN" position, rotated away from the rock shaft by rollers in the track and the latching mechanism in the released position.
Figure 5:
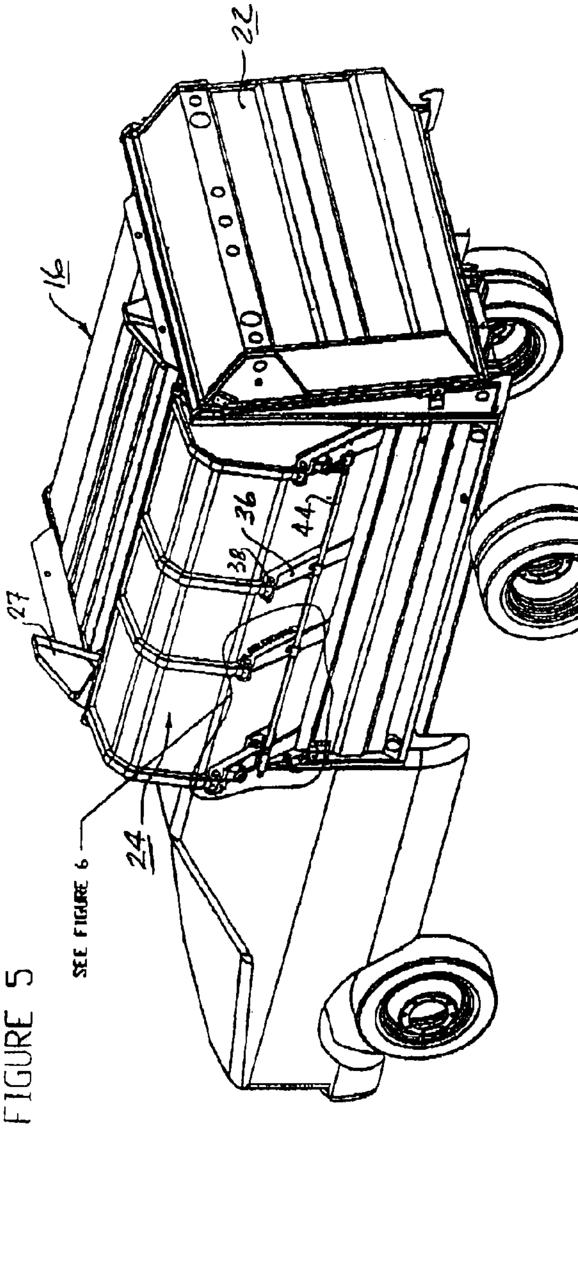
FIG. 5 is a perspective view of the side loading collection body with the bucket partially rotated to the "OUT" position.
Figure 6:
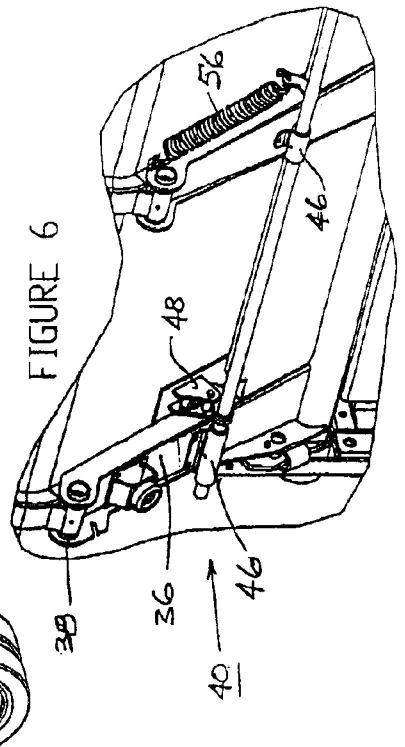
FIG. 6 is a perspective view showing the latching hook engaged and the cam follower disengaged.

A rocker assembly 28 is rotatably mounted to the collection body and is secured to the bucket 24 for rotation of the bucket between the lower loading position shown in FIG. 1 and thence through a range of raised positions for discharge and compaction of the materials into the collection body via the body opening 30. For example, FIG. 5 shows the loading bucket 24 in the raised position for discharge at what might be termed the "OUT" portion of this range of raised positions while FIG. 2 shows the loading bucket 24 at the "IN" end of this range of positions with the materials being compacted within the collection body between the "OUT" and "IN" positions referred to above.

The above-noted rocker assembly 28 comprises a rock shaft 32 rotatably mounted to fore and aft portions of the collection body via suitable front and rear bearings 34. The rock shaft is rotated by any well known hydraulic cylinder and linkage assembly (not shown). The rock shaft 32 is provided with a plurality of spaced apart rocker arms 36 fixed to the shaft. The distal end portions of the arms are connected at respective pivot points 38 to the loading bucket 24 to allow a measure of relative pivotal motion to take place therebetween during the compaction part of the cycle as will be described hereafter.

A latching mechanism 40 is provided to prevent the pivotal motion of the loading bucket relative to the rocker assembly during bucket motion between the lower loading position shown in FIG. 1 and the "OUT" part of the range of raised bucket positions referred to previously. This latching mechanism 40 is adapted to cause the bucket 24 and rocker assembly 28 to unlatch from one another while within the range of raised positions, i.e. between the "OUT" and "IN" positions, as the bucket is made to rotate relative to the rocker assembly by the bucket rollers 26 engaging trackways 27 during compaction of the materials. This same latching mechanism thereafter acts to re-latch the bucket 24 and rocker assembly 28 with one another just before the bucket leaves the "OUT" position and the trackways and is rotated downwardly toward the lower loading position.

Figure 3:
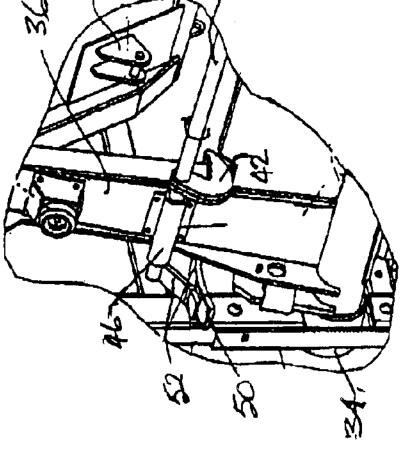
FIG. 3 is a perspective view showing the latching hook disengaged and the cam follower engaged.
Figure 4:
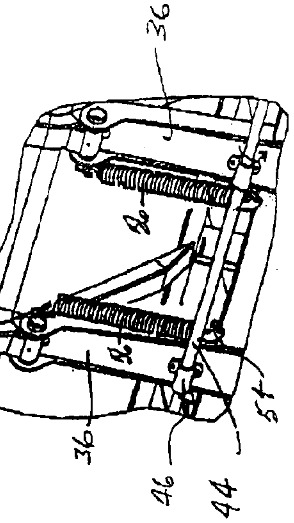
FIG. 4 is a perspective view showing the spring assembly which keeps the latching hook engaged.

The above-noted latching mechanism includes a plurality of spaced apart latch hooks 42 each fixedly mounted to an elongated latch shaft 44 which, in turn, is rotatably mounted to the above-noted rocker arms 36 via spaced latch shaft bearings 46. It will also be noted that the bucket is provided with spaced apart connecting lugs 48 fixed thereto and located for engagement by the respective latch hooks. A mechanism described below is provided for rotating the latch shaft 44 to bring the latch hooks 42 into engagement with the bucket connecting lugs 48 to prevent the pivotable motion of the bucket 24 relative to the rocker arms 36 as the bucket is moved between the lower loading position and the raised "OUT" position. As best seen in FIGS. 3, 4, 6 and 7–11, this mechanism comprises a cam 50 which is fixed to the inner frontal panel of the collection body and a cam follower 52 fixed to the forward end of the latch shaft 44 whereby to effect rotation of the latch shaft under the desired conditions. It will also be noted that the latch shaft 44 is provided with spaced lever arms 54 as best shown in FIG. 4, which arms are connected to respective coil tension springs 56, the upper ends of which are attached to the ends of the bucket-rocker arm pivot points 38. These tension springs 56 urge the latch shaft 44 in the counterclockwise direction, reference being had to FIGS. 3, 4 and 7–9. It will also be seen that the above-described cam 50, when it comes into contact with the cam follower 52, will rotate the latch shaft in the opposing clockwise direction as illustrated in FIGS. 3 and 4 against the biasing forces exerted by the coil tension springs 56.

It is significant to note that the latch hooks 42 are each provided with multiple notches 60 each of which is adapted to engage with an associated bucket-mounted connecting lug 48. By means of these multiple notches 60, the latching mechanism can engage the bucket at discrete multiple positions corresponding to multiple angular positions of the bucket with respect to the rocker arms within a selected range as established by the distance between the innermost and outermost notches. Each notch 60 accordingly defines a respective one of the multiple angular positions of the bucket 24 with respect to the rocker arms 36.

Figure 8:
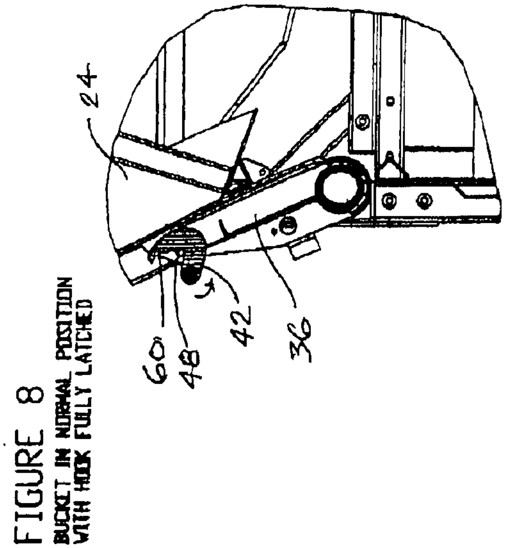
FIG. 8 is a cross-section showing the rotating latch hook engaged in the fully latched position.
Figure 9:
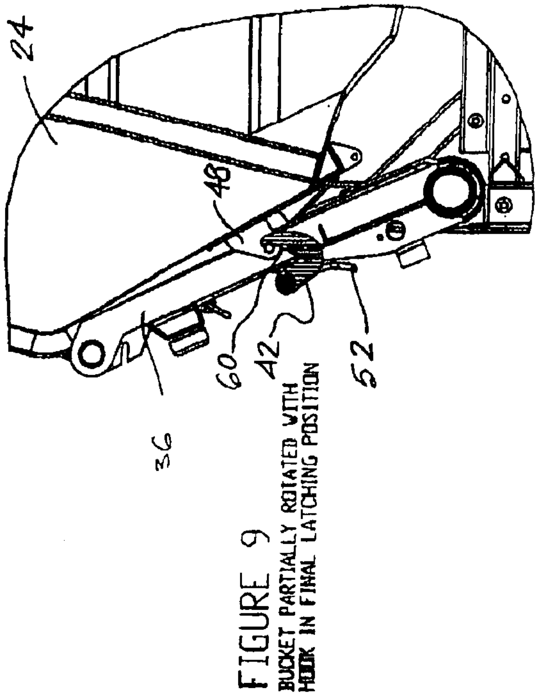
FIG. 9 is a cross-section of the latch hook engaged in the final notch.
Figure 7:
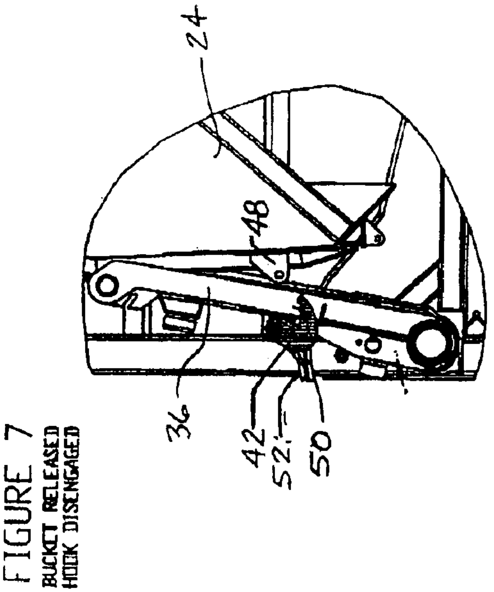
FIG. 7 is a cross-section showing the rotating latching hook disengaged from the bucket lug.
Figure 11:
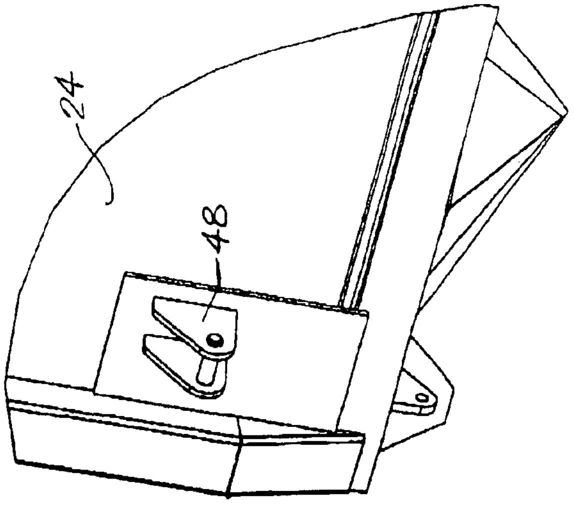
FIG. 11 is a perspective view showing details of the fixed bucket lug.
Figure 10:
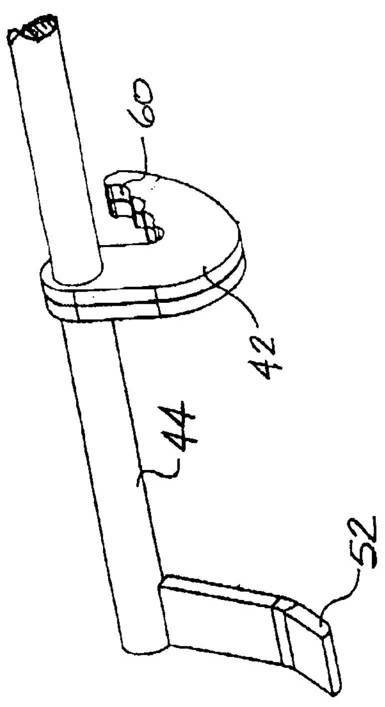
FIG. 10 is a perspective showing detail of the cam follower and the rotating latch hook.

The action of the latching mechanism can be readily understood with reference particularly to FIGS. 3, 4 and 7–9. As shown in FIG. 8, the bucket is in a so-called "normal" position with the latch hooks 42 "fully latched", i.e. with the engagement lug 48 located in the innermost notch 60 of each latch hook 42. With reference to FIG. 7, the rock shaft assembly has been rotated clockwise from the previously mentioned "OUT" position to the "IN" position, in the course of which material compaction may take place. As this motion occurs, the cam follower 52 comes into contact with the above-noted cam 50, causing the latch shaft 44 and associated latch hooks 42 to be rotated clockwise thus releasing the latch hooks from the connecting lugs 48 and allowing the loading bucket 24 to pivot relative to the rock shaft arms 36 under the guiding influence of the bucket rollers 26 and the front and rear tracks 27 which the rollers engage in known fashion. On completion of the compacting cycle, the rock shaft assembly is rotated in the opposite direction and as the "OUT" bucket position is approached and as bucket rollers being to clear tracks 27, the cam follower 52 clears the cam 50 and the coil tension springs 56 noted above effect rotation of the latch shaft 44 and latch hooks 42 counterclockwise such that the latch hooks engage the bucket-mounted lugs 48 thus preventing further pivotal motion between the rock shaft arms 36 and the loading bucket 24 as the latter is rotated toward the lower loading position. However, should some of the materials being collected and compacted be caught in the mechanisms at some point such as to resist full return of the bucket 24 to the "normal" position shown in FIG. 8, the latching process can still be affected. This is illustrated in FIG. 9 wherein some material (not shown) has prevented the bucket 24 from assuming the "normal" position with respect to the rocker arms 36 and in this case, the latch hooks 42 are only able to engage with the connecting lugs 48 via an outermost notch 60. However, this still provides for proper securement of the bucket 24 relative to the rock shaft arms 36 and prevents the bucket from rotating outwardly as it is being lowered to the loading position. Depending on the size and location of the trapped materials which prevent return of the bucket to the "normal" position relative to the rocker arms as shown in FIG. 8, the connecting lugs 48 will come into engagement with the latch hooks 42 at any one of the notches 60 between the innermost one as illustrated in FIG. 8 to and including the outermost or final notch illustrated in FIG. 9.

It will therefore be seen from the above that the latching mechanism described above, which allows the bucket and rock shaft assembly to engage and disengage over a range rather than at one particular point, is less subject to failure caused by materials becoming caught in the mechanisms at various positions and thus the collection apparatus as a whole can function better under a wide variety of operating conditions to satisfy the objectives stated previously. A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

What is claimed is:

1. A refuse/recyclables materials collecting apparatus comprising:

a) a collection body for receiving said materials;

b) a loading bucket mounted to said collection body;

c) a rocker assembly rotatably mounted to said collection body and secured to said bucket for rotation of said bucket between a lower loading position and outer and inner raised positions with compaction of materials discharged into said collection body occurring as said bucket moves from said outer to said inner raised position relative to said collection body;

d) said bucket being pivotally connected to said rocker assembly to allow pivotal motion of said bucket relative to said rocker assembly when compacting of the material takes place between the outer and inner bucket positions;

e) a latching mechanism engaging to prevent the pivotal motion of said bucket relative to said rocker assembly during bucket motion between said lower loading position and the outer one of said bucket positions and disengaging to allow said relative pivotal motion during bucket movement between the outer and inner positions;

f) said latching mechanism being adapted to permit said bucket and rocker assembly to engage and disengage from one another over a selected range of angular positions of said bucket relative to said rocker assembly;

g) said rocker assembly comprising a rock shaft having a plurality of rocker arms fixed thereto with distal end portions of said arms being connected at respective pivot points to said bucket to allow said relative pivotal motion;

h) said latching mechanism being adapted to engage said bucket at discrete multiple positions corresponding to multiple angular positions of said bucket with respect to said rocker arms within said selected range;

i) said latching mechanism including latch hooks fixedly mounted to a latch shaft which in turn is rotatably mounted to said rocker arms, said bucket including connecting lugs fixed thereto for engagement by the respective latch hooks and a mechanism for rotating said latch shaft to bring said latch hooks into engagement with said bucket connecting lugs to prevent said pivotal motion of the bucket relative to said rocker arms as the bucket is moved between said loading position and said outer position; wherein each of said latch hooks is provided with multiple notches adapted to engage with an associated connecting lug, with each notch defining a respective one of said multiple angular positions of said bucket with respect to said rocker arms.

2. The collecting apparatus of claim 1 wherein said mechanism comprises a cam and a cam follower assembly to effect said rotation of the latch shaft.

* * * * *